US011064018B1

(12) United States Patent
Rodney et al.

(10) Patent No.: US 11,064,018 B1
(45) Date of Patent: Jul. 13, 2021

(54) INCORPORATING SOFTWARE DEFINED NETWORKING RESOURCE UTILIZATION IN WORKLOAD PLACEMENT

(71) Applicant: VMware, Inc., Palo Alto, CA (US)

(72) Inventors: Prerit Rodney, Sunnyvale, CA (US); Subin Cyriac Mathew, San Jose, CA (US); Chidambareswaran Raman, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/743,383

(22) Filed: Jan. 15, 2020

(51) Int. Cl.
  *H04L 29/08* (2006.01)
  *H04L 29/06* (2006.01)
  *H04L 12/931* (2013.01)

(52) U.S. Cl.
  CPC .............. *H04L 67/10* (2013.01); *H04L 49/70* (2013.01); *H04L 63/029* (2013.01)

(58) Field of Classification Search
  None
  See application file for complete search history.

(56) References Cited

U.S. PATENT DOCUMENTS

| | | | | |
|---|---|---|---|---|
| 8,095,929 B1 * | 1/2012 | Ji | ........................... | G06F 9/4856 718/1 |
| 9,466,036 B1 * | 10/2016 | Vicaire | .................... | H04L 67/10 |
| 9,602,590 B1 * | 3/2017 | Lu | ........................... | G06F 9/5061 |
| 2007/0204266 A1 * | 8/2007 | Beaty | .................. | G06F 9/45558 718/1 |
| 2010/0070784 A1 * | 3/2010 | Gupta | ................... | G06F 1/3287 713/310 |
| 2010/0191854 A1 * | 7/2010 | Isci | ........................ | G06F 1/3203 709/226 |
| 2014/0376560 A1 * | 12/2014 | Senniappan | ............ | H04L 49/70 370/401 |
| 2017/0329644 A1 * | 11/2017 | Imamura | .................. | G06F 9/505 |
| 2018/0191607 A1 * | 7/2018 | Kanakarajan | .......... | G06F 9/5077 |
| 2019/0288914 A1 * | 9/2019 | Celozzi | ............... | G06F 9/45558 |
| 2019/0364116 A1 * | 11/2019 | Hiltunen | ................. | H04L 67/34 |
| 2019/0394078 A1 * | 12/2019 | Ghosh | ................. | G06F 9/45558 |
| 2020/0162430 A1 * | 5/2020 | Lim | ..................... | H04L 63/0263 |

OTHER PUBLICATIONS

"Recommended Configuration Maximums", Published Aug. 8, 2018. (Year: 2018).*

* cited by examiner

*Primary Examiner* — Scott B Christiansen
(74) *Attorney, Agent, or Firm* — Patterson + Sheridan, LLP

(57) ABSTRACT

The disclosure provides an approach for workload migration. Embodiments include receiving logical network resource capacity information and logical network resource utilization information relating to a plurality of host computers and to one or more logical network resources. Embodiments include determining that a virtual computing instance (VCI) is to be run on one of the plurality of host computers and determining for each respective host computer of the plurality of host computers, a respective realization cost of the VCI for the respective host computer, wherein the respective realization cost relates to the one or more logical network resources. Embodiments include selecting, based on the logical network resource capacity information, the logical network resource utilization information, and the realization cost, a target host computer for the VCI from the plurality of host computers and loading the VCI on the target host computer.

20 Claims, 4 Drawing Sheets

INCORPORATING SOFTWARE DEFINED NETWORKING RESOURCE UTILIZATION IN WORKLOAD PLACEMENT

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The rapid growth of network virtualization has led to an increase in large scale SDN data centers. The scale of such data centers may be very large, often including hundreds of servers with each server hosting hundreds of VCIs. With such scale comes a need to be able to operate such topologies efficiently and avoid errors that may result in downtime. There are tools that troubleshoot network connectivity issues and help to provide a highly available network infrastructure, such as through load balancing based on processor and memory utilization on hosts. One or more components in the SDN may handle the placement and migration of workloads, such as VCIs, on hosts in order to achieve load balancing. However, not all network issues are a result of processor or memory load. Other factors, such as logical entity limits, flow table limits, and the like can affect the functioning of VCIs on hosts.

SUMMARY

Embodiments provide a method of workload migration. Embodiments include: receiving, by a resource optimization system, logical network resource capacity information and logical network resource utilization information relating to a plurality of host computers, wherein the logical network resource capacity information and the logical network resource utilization information relate to one or more logical network resources; determining, by the resource optimization system, that a virtual computing instance (VCI) is to be run on one of the plurality of host computers; determining, by the resource optimization system, for each respective host computer of the plurality of host computers, a respective realization cost of the VCI for the respective host computer, wherein the respective realization cost relates to the one or more logical network resources; selecting, by the resource optimization system, based on the logical network resource capacity information, the logical network resource utilization information, and the realization cost, a target host computer for the VCI from the plurality of host computers; and loading, by the resource optimization system, the VCI on the target host computer.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
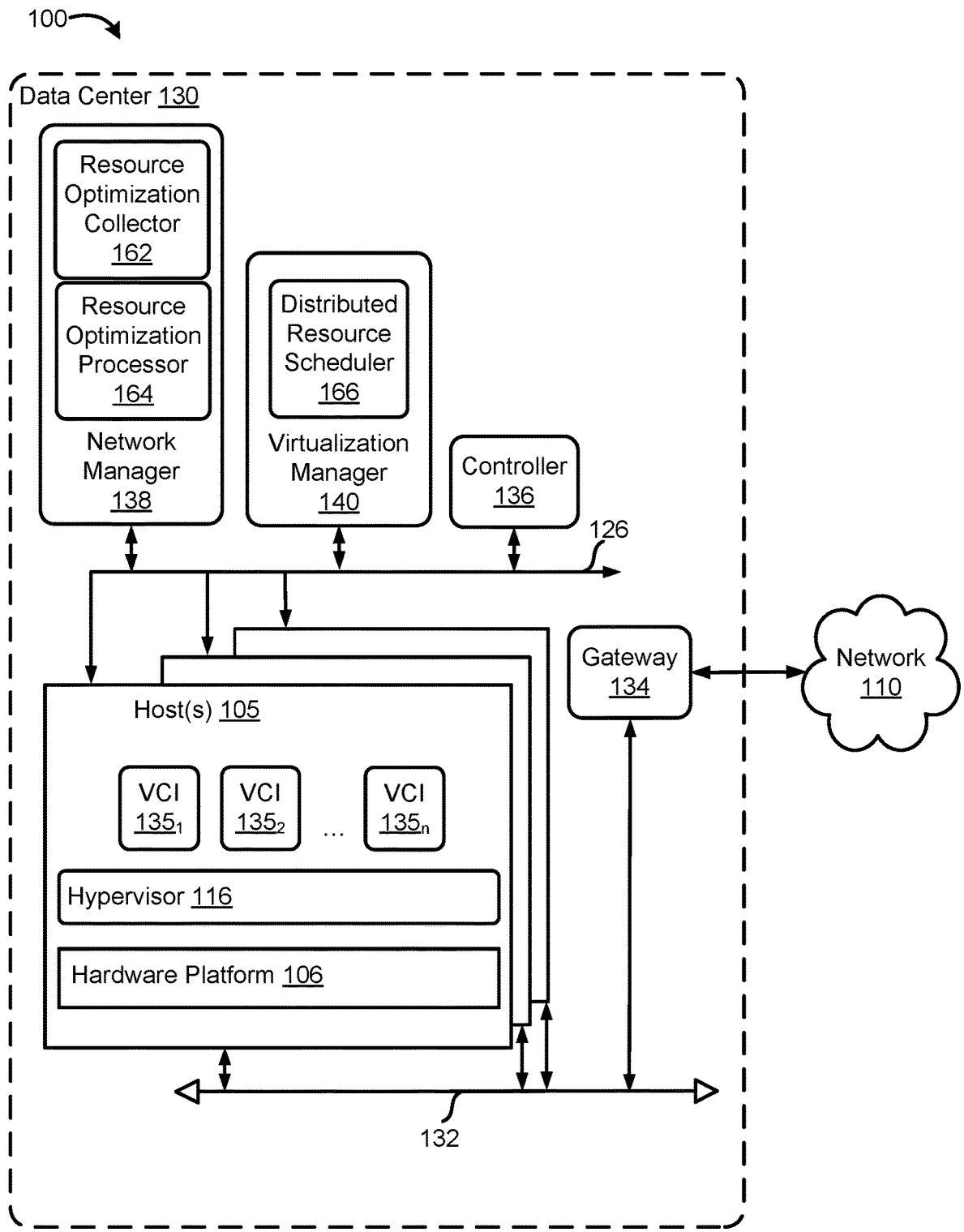
FIG. 1 depicts example physical and virtual network components with which embodiments of the present disclosure may be implemented.

The present disclosure provides an approach for incorporating SDN resource utilization in workload placement.

While some existing techniques for workload placement involve considering physical resource utilization, such as processor and memory utilization, at hosts in order to select a host on which to place a workload, these techniques may not be effective at preventing certain errors and inefficiencies. For example, a host generally has limits on logical network resources that can be implemented on the host, such as limits on logical switches, logical ports, logical routers, and other types of logical entities, as well as limits on sizes of firewall rules tables, flow tables, and the like. If these limits are exceeded, network failures can result. When workloads are placed on hosts based on physical resource utilization without consideration for logical network resource utilization, the workloads can cause logical network resource limits to be exceeded, resulting in failures and loss of data.

Accordingly, embodiments of the present disclosure involve collecting data about logical network resource utilization on hosts. In some embodiments, a collector component of a resource optimization system resides in a management plane and collects logical network resource capacity information and logical network resource utilization information about each host. Logical network resource capacity information refers to limits on numbers of various types of logical network resources that can be implemented on a given host, such as a maximum number of logical switches, a maximum number of logical ports, a maximum number of logical routers, a maximum firewall table size, a maximum flow table size, and the like. Logical network resource utilization information refers to information about how many of various types of logical network resources are running on each given host, such as numbers of logical switches, logical ports, logical routers, entries in flow tables, and rules in firewall tables on each given host. The collector component may receive this information from a management component that configures each host and is therefore aware of logical entity limits (e.g., maximum number of logical switches that can be implemented on a host) as well as current logical entity counts (e.g., current number of logical switches) on each host. In alternative embodiments, the collector component receives this information from the hosts. The collector component then provides this information to a processor component of the resource optimization system. The processor component may, for instance, run on a management server or on a VCI on a host (or, alternatively, may be distributed across multiple VCIs) in order to offload processing tasks from the management plane (e.g., so as not to overburden the server on which management plane components reside).

In certain embodiments, the processor component performs processing related to determining a host on which to place a given workload based on logical network resource utilization. In an example, the processing component receives a request from a distributed resource scheduler (DRS) to recommend one or more hosts for placement of a VCI. The DRS generally represents a component of the resource optimization system that handles workload placement, such as the migration of VCIs between hosts for load balancing and other purposes. For example, in the VMware vSphere®, available from VMware Inc., the need for migration is determined using an automatic resource allocation software tool known as VMware vSphere® Distributed Resource Scheduler™, and the migration is carried using live migration, in which a VM is migrated from one host to another with substantially no downtime.

Upon receiving a request from the DRS for a recommendation related to a placement of a VCI, the processor component determines a realization cost for the placement for each host. The realization cost for a given host represents the number of logical entities that would need to be added and implemented on the host in order to place the VCI on the given host. For example, placing the VCI on a given host may require adding a certain number of firewall rules to a firewall rules table on the host as well as adding a certain number of logical switches implemented as virtual switches on the host, and a certain number of logical routers implemented as virtual routers, where the logical routers are coupled to the logical switches. For example, if a particular logical router is implemented at a host, then all of the logical switches coupled to that logical router also need to be implemented at the host to ensure proper routing in the logical overlay network. In particular, even if a single VCI coupled to only one logical switch coupled to a logical router is implemented on a host, all the remaining logical switches coupled to the logical router still need to be implemented on the host, despite such remaining logical switches not necessarily being coupled to any VCI on the given host. The realization cost for the VCI may vary between hosts. For instance, a first host may already include an instance of a logical router (e.g., implemented as a virtual router on the first host) to which the VCI is connected via a logical switch, and so no new logical routers or logical switches would need to be added and implemented on the first host (e.g., implemented as one or more virtual routers or virtual switches, respectively) in order place the VCI on the first host. A second host, on the other hand, may not include an instance of the logical router, and so the logical router and all of its logical switches would need to be added and implemented on the second host in order to place the VCI on the second host. As such, the realization cost for the VCI would be higher for the second host than for the first host.

The processor component then uses the realization cost for a given host in conjunction with the logical network resource capacity information and the logical network resource utilization information for the given host received from the collector component to determine one or more hosts on which the VCI may be placed. If placing the VCI on a host would result in a logical network resource limit being exceeded for the host, then the host is removed from consideration. For example, if the realization cost for a given host indicates that a certain number of logical switches would need to be added and implemented on the host and this would cause the logical switch limit for the given host to be exceeded based on the existing logical switches implemented at the host, then the given host is determined to be ineligible for placement of the VCI. In this way, the processor component may determine which host or hosts to recommend for placement of the VCI.

In some embodiments, the processor component responds to the request from the DRS with a list of hosts on which the VCI can be placed. In certain embodiments, the processor component ranks the hosts. For instance, hosts for which placement of the VCI would result in one or more logical network resource limits being met or nearly met may be ranked lower than hosts for which placement of the VCI would not have such a significant impact with respect to logical network resource limits. This ranking may be achieved, for example, by computing scores for hosts based on the realization costs, the logical network resource utilization information, and, in some embodiments, the logical network resource capacity information. In other embodiments, the logical network resource capacity information is only used to eliminate hosts on which the VCI cannot be placed without exceeding a logical network resource limit.

The DRS may select a host on which to place the VCI based on the one or more hosts recommended by the processor component. In some embodiments, the DRS also bases its selection on additional information, such as physical resource utilization information for the hosts. For example, the DRS may receive processor utilization and memory utilization information for each host, and may select a host based on processor utilization and memory utilization as well as recommendations from the processor component.

Once the DRS selects a host on which to place the VCI, the VCI is placed on the selected host. In some embodiments, the VCI is placed on the selected host by a migration component of the resource optimization system, which may also reside in the management plane. As such, techniques described herein allow workloads to be placed on hosts based on both physical resource utilization and logical network resource utilization information from the hosts.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_4$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although the disclosure is described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Network manager 138 and virtualization manager 140 generally represent components of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, network manager 138 is a computer program that executes in a central server in networking environment 100, or alternatively, network manager 138 may run in a VM, e.g. in one of hosts 105. Network manager 138 is configured to receive inputs from an administrator or other entity, e.g., via a web interface or API, and carry out administrative tasks for data center 130, including centralized network management and providing an aggregated system view for a user.

In an embodiment, virtualization manager 140 is a computer program that executes in a central server in data center 130 (e.g., the same or a different server than the server on which network manager 138 executes), or alternatively, virtualization manager 140 runs in one of VCIs 135. Virtualization manager 140 is configured to carry out administrative tasks for data center 130, including managing hosts 105, managing VCIs 135 running within each host 105, provisioning VCIs 135, transferring VCIs 135 from one host to another host, transferring VCIs 135 between data centers, transferring application instances between VCIs 135 or between hosts 105, and load balancing among hosts 105 within data center 130. Virtualization manager 140 takes commands from components located on control network 126 as to creation, migration, and deletion decisions of VCIs 135 and application instances on data center 130. However, virtualization manager 140 also makes independent decisions on management of local VCIs 135 and application instances, such as placement of VCIs 135 and application instances between hosts 105. One example of virtualization manager 140 is the vCenter Server™ product available from VMware, Inc. Virtualization manager 140 includes a distributed resource scheduler (DRS). In some embodiments, virtualization manager 140 also includes a migration component that performs migration of VCIs between hosts 105, such as by live migration.

Network manager 138 includes a resource optimization collector 162 that collects logical network resource capacity information and logical network resource utilization information for hosts 105. This information may be provided to resource optimization collector 162 by network manager 138, which maintains information about logical network resources implemented on each of hosts 105 as well as logical network resource limits (e.g., based on configuration information provided by a user, such as a network administrator). Resource optimization collector 162 provides the logical network resource capacity information and logical network resource utilization information to resource 164, which performs processing related to determining hosts on which to place VCIs.

While resource optimization processor 164 is depicted on network manager 138, optimization processor 164 may alternatively be located on a VCI, virtualization manager 140, or another local or remote location. In some embodiments, optimization processor 164 is distributed across a plurality of VCIs.

Resource optimization processor 164 receives requests from DRS 166 to recommend (or recommend against) one or more of hosts 105 on which to place a VCI. Resource optimization processor determines a realization cost for placing the VCI on each host 105, such as by determining how many of various types of logical entities would need to be added to each given host 105 to place the VCI on the given host 105. Resource optimization processor 164 then determines, based on the realization costs and the logical network resource capacity information and logical network resource utilization information received from resource optimization collector 162 if any logical network resource limits would be exceeded on any given host 105 if the VCI were placed on the given host 105. If a logical network resource limit would be exceeded for a given host 105, then the given host 105 is excluded.

Resource optimization processor 164 then selects one or more hosts 105 for which logical network resource limits would not be exceeded as recommended hosts on which to place the VCI. In some embodiments, resource optimization processor 164 ranks hosts 105 based on the impact placing the VCI would have on each host 105. For example, a host 105 for which placing the VCI would result in a logical network resource limit being met or nearly met may be ranked lower than a host 105 for which placing the VCI would not result in a logical network resource limit being met or nearly met. In an alternate embodiment, resource optimization processor 164 identifies one or more hosts 105 for which logical network resource limits would be exceeded as hosts that should be excluded from consideration for placing the VCI. It is also possible to provide a set of ranked "top" choices, or scoring, based on capacity to host additional logical network resources. For example, ranking and/or scoring could factor not just available capacity but also the extent to which required logical entities for a VCI are already present on the host, which can lead to greater efficiencies.

Resource optimization processor 164 then provides the one or more selected hosts 105 as recommendations (or other relevant information such as exclusions, ranking, or scoring) to DRS 166 (e.g., ordered according to rank). DRS 166 selects a host 105 on which to place the VCI based on the recommendations and, in some embodiments, based also on other factors such as processor and memory utilization on hosts 105. Once a host 105 is selected, virtualization manager 140 places the VCI on the host 105.

It is noted that resource optimization collector 162, resource optimization processor 164, DRS 166, and other components of virtualization manager 140 and/or network manager 138 that perform operations related to placement of VCIs on hosts may be referred to collectively as a resource optimization system. In alternative embodiments, the resource optimization system is implemented as a single component.

Figure 2:
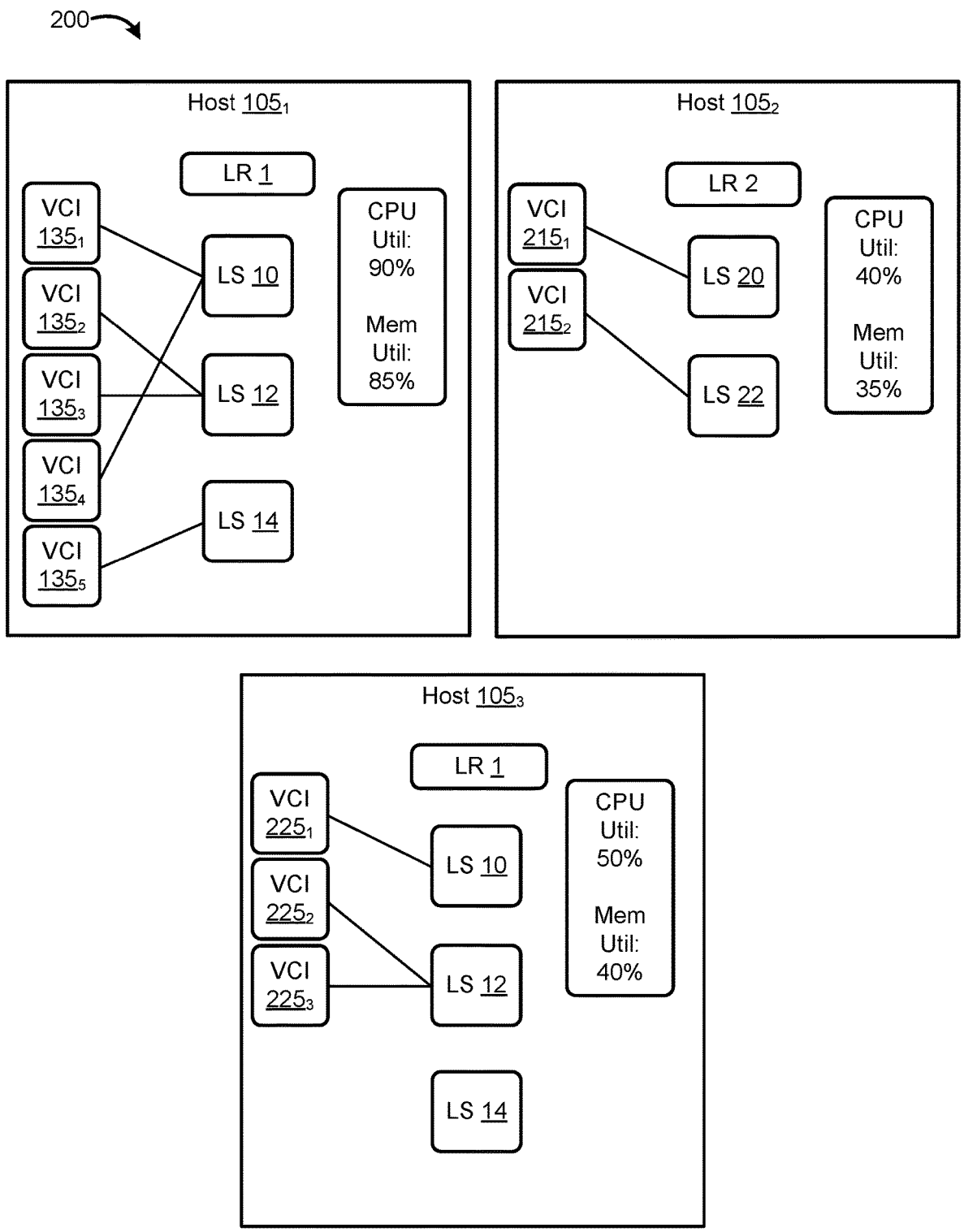
FIG. 2 depicts an example of logical and physical resource utilization on hosts related to a workload migration according to embodiments of the present disclosure.

FIG. 2 depicts an example 200 of logical and physical resource utilization on hosts related to a workload migration according to embodiments of the present disclosure. Example 200 includes hosts $105_1$, $105_2$, and $105_3$, which generally represent instances of hosts 105 of FIG. 1.

Host $105_1$ includes five VCIs $135_1$-$135_5$ connected to logical switches 10, 12, and 14 of logical router 1. Accordingly, logical switches 10, 12, and 14 of logical router 1 are implemented on host $105_1$ as one or more virtual switches and one or more virtual routers. Host $105_1$ has a central processing unit (CPU) utilization of 90% and a memory utilization of 85%. In one example, DRS 166 of FIG. 1 decides to migrate VCI $135_5$ to a different host in order to reduce the load on host $105_1$. While conventional techniques may lead to host $105_2$ being selected rather than host $105_3$ because host $105_2$ has a lower CPU utilization and memory utilization (40% and 35%, respectively) than host $105_3$ (which has a CPU utilization of 50% and a memory utilization of 40%), these techniques may not take into account the logical network resource impact of the migration. As such, techniques described herein involve considering logical network resource utilization in placing VCIs on hosts.

According to embodiments of the present disclosure, a realization cost of migrating VCI $135_5$ to each of hosts $105_2$ and $105_3$ is determined. VCI $135_5$ is connected to logical switch 14 of logical router 1 on host $105_1$, so any host to which VCI $135_5$ is migrated must include logical router 1 and all of its logical switches 10, 12, and 14. That is, forwarding table entries for logical switches connected to a logical router must be loaded into the forwarding table (not shown) for the virtual switch (not shown) in each host. It should also be noted that each logical router, which may be distributed across a number of hosts, may be implemented as a set of routing table entries in a virtual router (not shown) on each of the hosts. Host $105_2$ includes VCIs 2151 and 2152 connected to logical switches 20 and 22 of logical router 2, but does not include logical router 1. As such, in order to migrate VCI $135_5$ to host $105_2$, logical router 1 with all of its logical switches 10, 12, and 18 would need to be added and implemented on host $105_2$, raising its total number of logical switches implemented to five.

Host $105_3$ includes VCIs 2251, 2252, and 2253 connected to logical switches 10 and 12 of logical router 1. Because host $105_3$ already implements logical router 1 and all of its logical switches 10, 12, and 14, placing VCI $135_5$ on host $105_3$ would not require adding and implementing any logical switches or logical routers on host $105_3$, thus keeping the total number of logical switches implemented on host $105_3$ at three.

Thus, when logical network resource utilization is considered, particularly with respect to numbers of logical switches, host $105_3$ may be a better choice as a destination for migration of VCI $135_5$ even though it has a slightly higher CPU utilization and memory utilization than host $105_2$. Furthermore, if host $105_2$ has a logical switch limit of four (which is only included as a hypothetical example limit), then placing VCI $135_5$ on host $105_1$ would result in the limit being exceeded, as it would result in five logical switches on host $105_2$. Exceeding the limit may result in network failures. Accordingly, if the logical switch limit were four, then host $105_2$ would be excluded from consideration according to embodiments of the present disclosure, and host $105_3$ would be recommended by resource optimization processor 154 of FIG. 1 to DRS 166 of FIG. 1 as a destination for migration of VCI $135_5$. In some embodiments, logical network resource utilization and physical resource utilization may be used to determine an overall score for each host. For example, DRS 166 of FIG. 1 may use weighting factors for CPU, memory, and logical network resource utilization (e.g., based in part on recommendations from resource optimization processor 154 of FIG. 1), and may select a host on which to place VCI $135_5$ accordingly.

Figure 3:
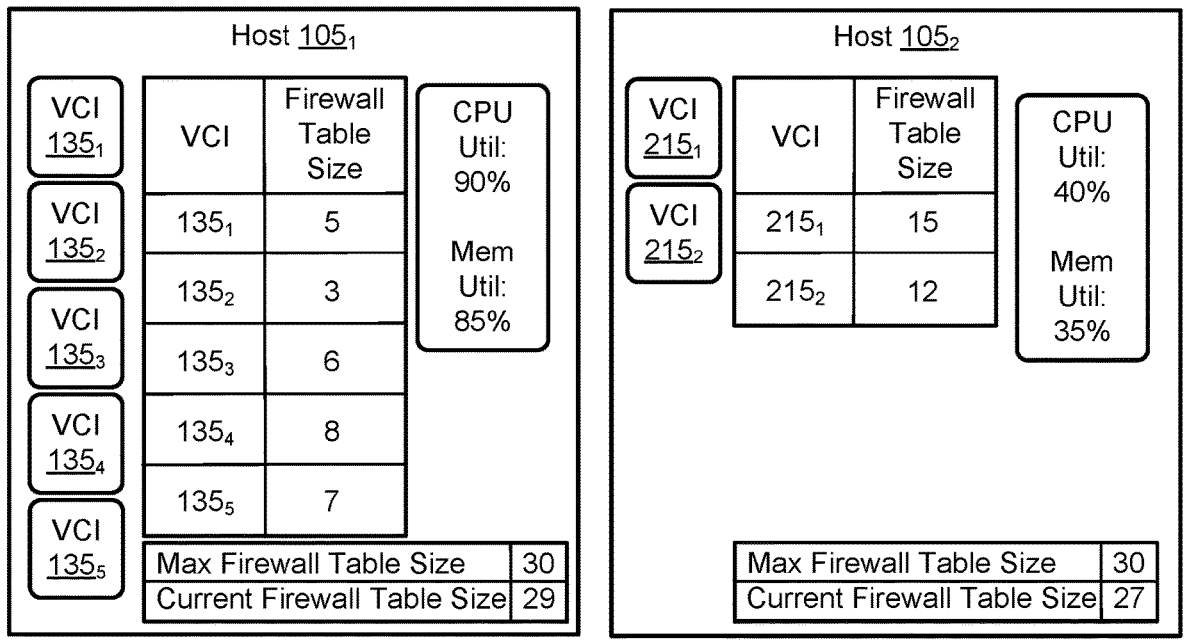
FIG. 3 depicts another example of logical and physical resource utilization on hosts related to a workload migration according to embodiments of the present disclosure.
Figure 3:
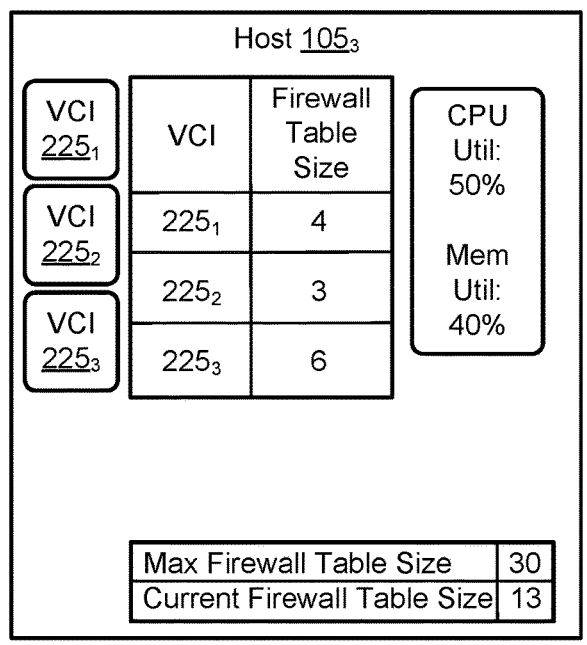

FIG. 3 depicts another example 300 of logical and physical resource utilization on hosts related to a workload migration according to embodiments of the present disclosure. Example 300 includes hosts $105_1$, $105_2$, and $105_3$ of FIG. 2.

Example 300 illustrates firewall table sizes of VCIs on hosts $105_1$, $105_2$, and $105_3$, as well as firewall table size limits. A firewall table size generally reflects a number of firewall rules stored in a firewall table, and a firewall table for a given VCI must be implemented on a host on which the given VCI is placed, such as by a firewall component of a hypervisor on the host. The firewall table size limit is a maximum number of firewall rules that can be stored on a host. In example 300, the firewall table size limit for hosts $105_1$, $105_2$, and $105_3$ is 30.

On host $105_1$, VCI $135_1$ has a firewall table size of 5, meaning there are five firewall rules maintained in host $105_1$ associated with VCI $135_1$. In addition, VCI $135_2$ has a firewall table size of 3, VCI $135_3$ has a firewall table size of 6, VCI $135_4$ has a firewall table size of 8, and VCI $135_5$ has a firewall table size of 7. The current total firewall table size on host $105_1$ is 29, meaning there are 29 firewall rules managed by host $105_1$. These numbers are for illustrative purposes only. In a real production environment, there may be many more firewall rules associated with each VM, and many more VMs on the host than shown and described in the present example.

On host $105_2$, VCI $215_1$ has a firewall table size of 15 and VCI $215_2$ has a firewall table size of 12. The current total firewall table size on host $105_2$ is 27.

On host $105_3$, VCI $225_1$ has a firewall table size of 4, VCI $225_2$ has a firewall table size of 3, and VCI $225_3$ has a firewall table size of 6. The current total firewall table size on host $105_3$ is 13.

The realization cost of migrating VCI $135_5$ to host $105_2$ would include adding 7 firewall rules for VCI $135_5$ to the firewall table of host $105_2$, resulting in a total firewall table size of 34 for host $105_2$. This would exceed the firewall table size limit of 30, and so host $105_2$ may be excluded from consideration by resource optimization processor 164 of FIG. 1.

The realization cost of migrating VCI $135_5$ to host $105_3$ would include adding 7 firewall rules for VCI $135_5$ to the firewall table of host $105_3$, resulting in a total firewall table size of 20 for host $105_3$. This would not exceed the firewall table size limit of 30, and so host $105_3$ may be recommended by resource optimization processor 164 of FIG. 1 to DRS 166 of FIG. 1 as a host on which to place VCI $135_5$.

Figure 4:
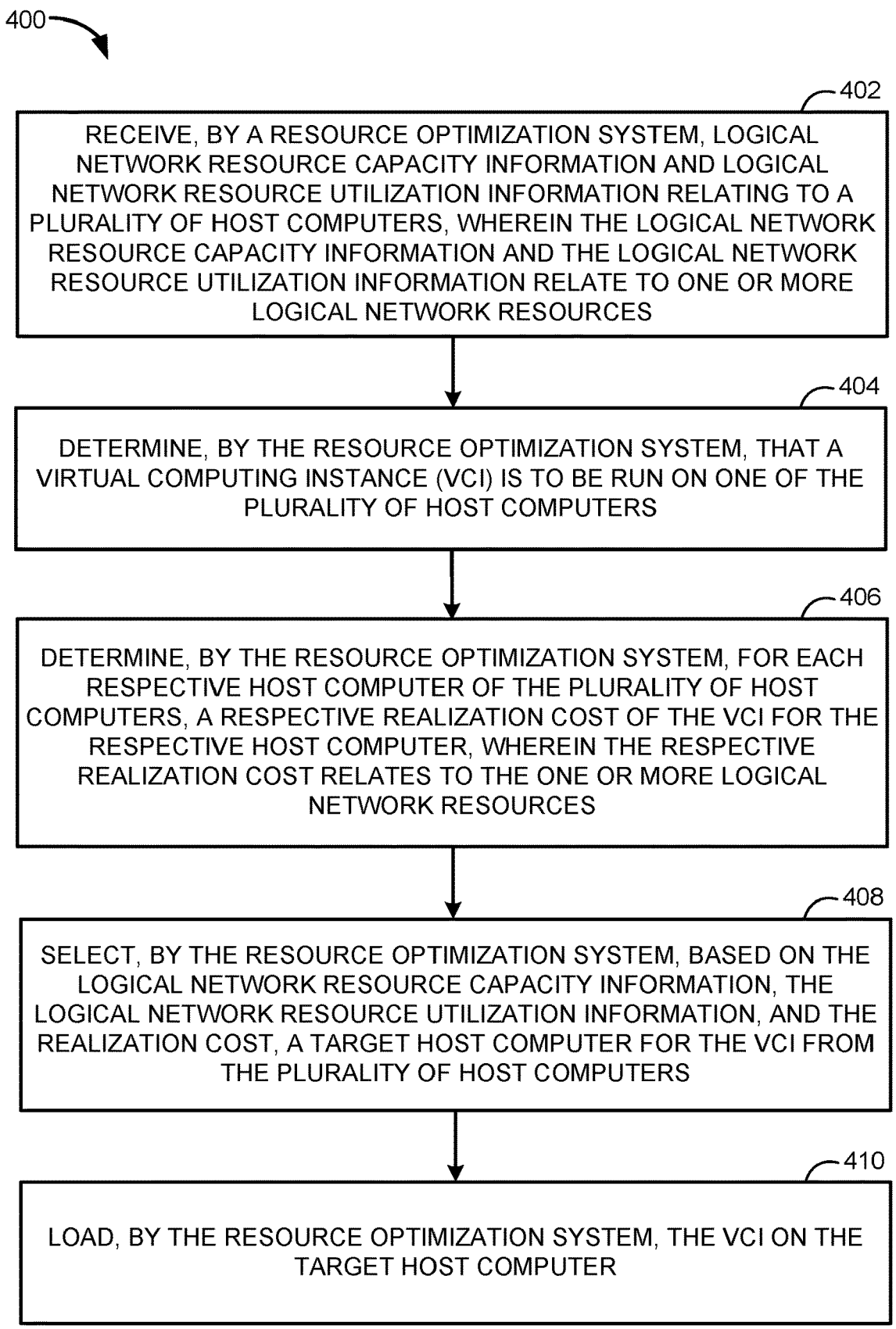
FIG. 4 depicts example operations for workload migration according to embodiments of the present disclosure.

FIG. 4 depicts example operations 400 for workload migration according to embodiments of the present disclosure. For example, operations 400 may be performed by various components of a resource optimization system, such as resource optimization collector 162, resource optimization processor 164, DRS 166, and/or virtualization manager 140 of FIG. 1.

Operations 400 begin with step 402, where a resource optimization system receives logical network resource capacity information and logical network resource utilization information relating to a plurality of host computers, wherein the logical network resource capacity information and the logical network resource utilization information relate to one or more logical network resources. The logical network resource utilization information may include current numbers of various types of logical network resources that are currently in use on each host computer of the plurality of host computers, such as current numbers of logical routers, logical ports, logical switches, other logical entities in the packet processing path, firewall rules, flow table entries, and the like. The logical network resource capacity information may include logical network resource limits, such as maximum numbers of various types of logical network resources that can be implemented on a given host computer.

At step 404, the resource optimization system determines that a VCI is to be run on one of the plurality of host computers. The determination may be made, for instance, as part of an ongoing load balancing process, such as based on CPU utilization and/or memory utilization on the plurality of host computers. In one example the VCI is being created and placed on a host computer for the first time, while in other examples, the VCI already exists and is being migrated from a source host computer.

At step 406, the resource optimization system determines, for each respective host computer of the plurality of host computers, a respective realization cost of the VCI for the respective host computer, wherein the respective realization cost relates to the one or more logical network resources. In an example, the resource optimization system determines how many of each given type of logical network resource would need to be added to each respective host computer in order to place the VCI on the respective host computer.

At step 408, the resource optimization system selects, based on the logical network resource capacity information, the logical network resource utilization information, and the realization cost, a target host computer for the VCI from the plurality of host computers. In some embodiments, the resource optimization system excludes host computers for which placing the VCI would result in a logical network resource limit being exceeded. In some embodiments, the target host computer is selected because placing the VCI on the target host computer would result in a smaller addition of logical network resources than would placing the VCI on other host computers of the plurality of host computers.

In some embodiments, more than one host computer is recommended, and all recommended host computers are ranked according to the logical network resource impact that placement of the VCI would have on the recommended host computers. Then the target host computer is selected based on the recommended host computers in congruence with other factors, such as CPU utilization and memory utilization at each of the recommended host computers (e.g., using weighting factors).

At step 410, the resource optimization system loads the VCI on the target host computer.

In certain embodiments, the one or more logical network resources comprise a logical switch, and the logical network resource capacity information comprises a maximum number of logical switches for each given host computer of the plurality of host computers.

In some embodiments, determining, by the resource optimization system, the respective realization cost of the VCI for the respective host computer comprises determining a number of logical switches that would need to be added to the respective host computer to run the VCI on the respective host computer.

In certain embodiments, the one or more logical network resources comprise a firewall table, and the logical network resource capacity information comprises a maximum firewall table size for each given host computer of the plurality of host computers.

In some embodiments, determining, by the resource optimization system, the respective realization cost of the VCI for the respective host computer comprises determining a number of firewall rules that would need to be added to a respective firewall table of the respective host computer to run the VCI on the respective host computer.

In certain embodiments, selecting the target host computer for the VCI from the plurality of host computers is further based on a processor utilization and a memory utilization of the target host computer.

In some embodiments, the logical network resource capacity information and the logical network resource utilization information relating to the plurality of host computers are received from a management plane.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of workload migration, comprising:
   receiving, by a resource optimization system, logical network resource capacity information and logical network resource utilization information relating to a plurality of host computers, wherein, for each of the plurality of host computers, the logical network resource capacity information relates to a limit on a number of logical network resources that can be implemented on the respective host computer, and wherein, for each of the plurality of host computers, the logical network resource utilization information relates to a number of logical network resources that are running on the respective host computer;
   determining, by the resource optimization system, that a virtual computing instance (VCI) is to be run on one of the plurality of host computers, wherein the VCI is associated with one or more logical network resources;
   determining, by the resource optimization system, for each respective host computer of the plurality of host computers, a respective realization cost of the VCI for the respective host computer, wherein the respective realization cost represents a number of the one or more logical network resources that would need to be added to the respective host computer in order to place the VCI on the respective host computer based on which of the one or more logical network resources are currently running on the respective host computer, wherein the number of the one or more logical network resources that would need to be added to the respective host is determined based on specific logical network resources currently running on the respective host that are required by the VCI and logical network resources that are not currently running on the respective host that are required by the VCI;
   selecting, by the resource optimization system, based on the logical network resource capacity information, the logical network resource utilization information, and a comparison of at least a first realization cost of the VCI for a first host computer of the plurality of host computers with at least a second realization cost of the VCI for a second host computer of the plurality of host computers, a target host computer for the VCI from the plurality of host computers; and
   loading, by the resource optimization system, the VCI on the target host computer.

2. The method of claim 1, wherein the one or more logical network resources comprise one or more of:
   a logical switch;
   a logical port;
   a logical router;
   a firewall table; or
   a flow table.

3. The method of claim 1, wherein the one or more logical network resources comprise a logical switch, and wherein the logical network resource capacity information comprises a maximum number of logical switches for each given host computer of the plurality of host computers.

4. The method of claim 3, wherein determining, by the resource optimization system, the respective realization cost of the VCI for the respective host computer comprises determining a number of logical switches that would need to be added to the respective host computer to run the VCI on the respective host computer.

5. The method of claim 1, wherein the one or more logical network resources comprise a firewall table, and wherein the logical network resource capacity information comprises a maximum firewall table size for each given host computer of the plurality of host computers.

6. The method of claim 5, wherein determining, by the resource optimization system, the respective realization cost of the VCI for the respective host computer comprises determining a number of firewall rules that would need to be added to a respective firewall table of the respective host computer to run the VCI on the respective host computer.

7. The method of claim 1, wherein selecting the target host computer for the VCI from the plurality of host computers is further based on a processor utilization and a memory utilization of the target host computer.

8. The method of claim 7, wherein the logical network resource capacity information and the logical network resource utilization information relating to the plurality of host computers are received from a management plane.

9. A system, comprising one or more processors and a non-transitory computer readable medium comprising instructions that, when executed by the one or more processors, cause the system to perform a method of workload migration, the method comprising:
   receiving, by a resource optimization system, logical network resource capacity information and logical network resource utilization information relating to a plurality of host computers, wherein, for each of the plurality of host computers, the logical network resource capacity information relates to a limit on a number of logical network resources that can be implemented on the respective host computer, and wherein, for each of the plurality of host computers, the logical network resource utilization information relates to a number of logical network resources that are running on the respective host computer;
   determining, by the resource optimization system, that a virtual computing instance (VCI) is to be run on one of the plurality of host computers, wherein the VCI is associated with one or more logical network resources;
   determining, by the resource optimization system, for each respective host computer of the plurality of host computers, a respective realization cost of the VCI for the respective host computer, wherein the respective realization cost represents a number of the one or more logical network resources that would need to be added to the respective host computer in order to place the VCI on the respective host computer based on which of the one or more logical network resources are currently running on the respective host computer, wherein the number of the one or more logical network resources that would need to be added to the respective host is determined based on specific logical network resources currently running on the respective host that are required by the VCI and logical network resources that are not currently running on the respective host that are required by the VCI;
   selecting, by the resource optimization system, based on the logical network resource capacity information, the logical network resource utilization information, and a comparison of at least a first realization cost of the VCI for a first host computer of the plurality of host computers with at least a second realization cost of the VCI for a second host computer of the plurality of host computers, a target host computer for the VCI from the plurality of host computers; and loading, by the resource optimization system, the VCI on the target host computer.

10. The system of claim 9, wherein the one or more logical network resources comprise one or more of:
a logical switch;
a logical port;
a logical router;
a firewall table; or
a flow table.

11. The system of claim 9, wherein the one or more logical network resources comprise a logical switch, and wherein the logical network resource capacity information comprises a maximum number of logical switches for each given host computer of the plurality of host computers.

12. The system of claim 11, wherein determining, by the resource optimization system, the respective realization cost of the VCI for the respective host computer comprises determining a number of logical switches that would need to be added to the respective host computer to run the VCI on the respective host computer.

13. The system of claim 9, wherein the one or more logical network resources comprise a firewall table, and wherein the logical network resource capacity information comprises a maximum firewall table size for each given host computer of the plurality of host computers.

14. The system of claim 13, wherein determining, by the resource optimization system, the respective realization cost of the VCI for the respective host computer comprises determining a number of firewall rules that would need to be added to a respective firewall table of the respective host computer to run the VCI on the respective host computer.

15. The system of claim 9, wherein selecting the target host computer for the VCI from the plurality of host computers is further based on a processor utilization and a memory utilization of the target host computer.

16. The system of claim 15, wherein the logical network resource capacity information and the logical network resource utilization information relating to the plurality of host computers are received from a management plane.

17. A non-transitory computer readable medium comprising instructions that, when executed by one or more processors of a computing system, cause the computing system to perform a method of workload migration, the method comprising:

receiving, by a resource optimization system, logical network resource capacity information and logical network resource utilization information relating to a plurality of host computers, wherein, for each of the plurality of host computers, the logical network resource capacity information relates to a limit on a number of logical network resources that can be implemented on the respective host computer, and wherein, for each of the plurality of host computers, the logical network resource utilization information relates to a number of logical network resources that are running on the respective host computer;

determining, by the resource optimization system, that a virtual computing instance (VCI) is to be run on one of the plurality of host computers, wherein the VCI is associated with one or more logical network resources;

determining, by the resource optimization system, for each respective host computer of the plurality of host computers, a respective realization cost of the VCI for the respective host computer, wherein the respective realization cost represents a number of the one or more logical network resources that would need to be added to the respective host computer in order to place the VCI on the respective host computer based on which of the one or more logical network resources are currently running on the respective host computer, wherein the number of the one or more logical network resources that would need to be added to the respective host is determined based on specific logical network resources currently running on the respective host that are required by the VCI and logical network resources that are not currently running on the respective host that are required by the VCI;

selecting, by the resource optimization system, based on the logical network resource capacity information, the logical network resource utilization information, and a comparison of at least a first realization cost of the VCI for a first host computer of the plurality of host computers with at least a second realization cost of the VCI for a second host computer of the plurality of host computers, a target host computer for the VCI from the plurality of host computers; and loading, by the resource optimization system, the VCI on the target host computer.

18. The non-transitory computer readable medium of claim 17, wherein the one or more logical network resources comprise one or more of:
a logical switch;
a logical port;
a logical router;
a firewall table; or
a flow table.

19. The non-transitory computer readable medium of claim 17, wherein the one or more logical network resources comprise a logical switch, and wherein the logical network resource capacity information comprises a maximum number of logical switches for each given host computer of the plurality of host computers.

20. The non-transitory computer readable medium of claim 19, wherein determining, by the resource optimization system, the respective realization cost of the VCI for the respective host computer comprises determining a number of logical switches that would need to be added to the respective host computer to run the VCI on the respective host computer.

* * * * *